United States Patent
Smith et al.

(10) Patent No.: US 7,672,537 B2
(45) Date of Patent: Mar. 2, 2010

(54) METHOD AND SYSTEM FOR IMPROVED DETECTION OF MATERIAL REFLECTANCES IN AN IMAGE

(75) Inventors: Casey Arthur Smith, Ithaca, NY (US); Richard Mark Friedhoff, New York, NY (US)

(73) Assignee: Tandent Vision Science, Inc., San Francisco, CA (US)

( * ) Notice: Subject to any disclaimer, the term of this patent is extended or adjusted under 35 U.S.C. 154(b) by 404 days.

(21) Appl. No.: 11/801,384

(22) Filed: May 9, 2007

(65) Prior Publication Data

US 2007/0263944 A1    Nov. 15, 2007

Related U.S. Application Data

(63) Continuation-in-part of application No. 11/431,755, filed on May 10, 2006, now abandoned.

(51) Int. Cl.
*G06K 9/36* (2006.01)
(52) U.S. Cl. .................. 382/278; 382/274; 382/275
(58) Field of Classification Search ............. 382/260, 382/274, 275, 278
See application file for complete search history.

(56) References Cited

U.S. PATENT DOCUMENTS

| | | | | |
|---|---|---|---|---|
| 5,347,475 A | | 9/1994 | Taylor et al. | 364/571.01 |
| 5,353,053 A | * | 10/1994 | Nishioka et al. | 348/33 |
| 5,604,534 A | | 2/1997 | Hedges et al. | 348/144 |
| 5,936,731 A | | 8/1999 | Cabib et al. | 356/346 |
| 6,000,847 A | * | 12/1999 | Close et al. | 378/207 |
| 6,074,339 A | * | 6/2000 | Gambale et al. | 600/3 |
| 6,219,159 B1 | | 4/2001 | Firl | 358/513 |
| 6,504,899 B2 | * | 1/2003 | Pugachev et al. | 378/65 |
| 6,543,936 B2 | * | 4/2003 | Feldman | 378/191 |
| 6,904,120 B2 | | 6/2005 | Wu et al. | 378/19 |

* cited by examiner

*Primary Examiner*—Yosef Kassa
(74) *Attorney, Agent, or Firm*—Davidson, Davidson & Kappel, LLC; Felix L. D'Arienzo, Jr.

(57) ABSTRACT

In a first exemplary embodiment of the present invention, an automated, computerized method for manipulating an image is provided. The method of the present invention comprises the steps of selecting matched shadow/lit pairs of image portions from each of separate, different materials depicted in the image, utilizing the selected matched pairs to determine spectral ratio information for the image, calculating a correction term as a function of the spectral ratio information and utilizing the correction term to manipulate the image, to remove effects, such as, for example, path radiance.

24 Claims, 3 Drawing Sheets

Path Radiance Correction

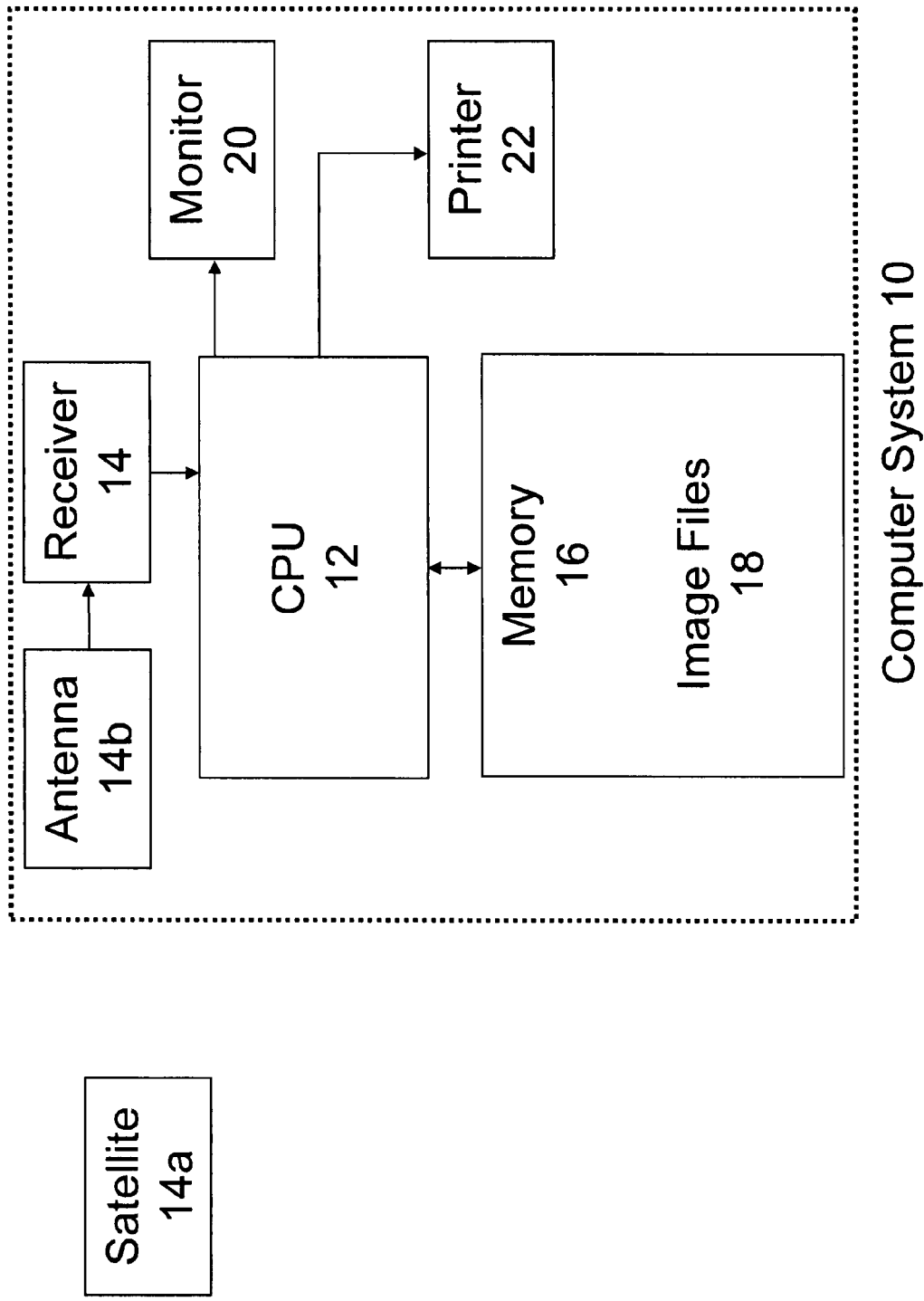
Figure 1: Computer System Configured to Operate on Images

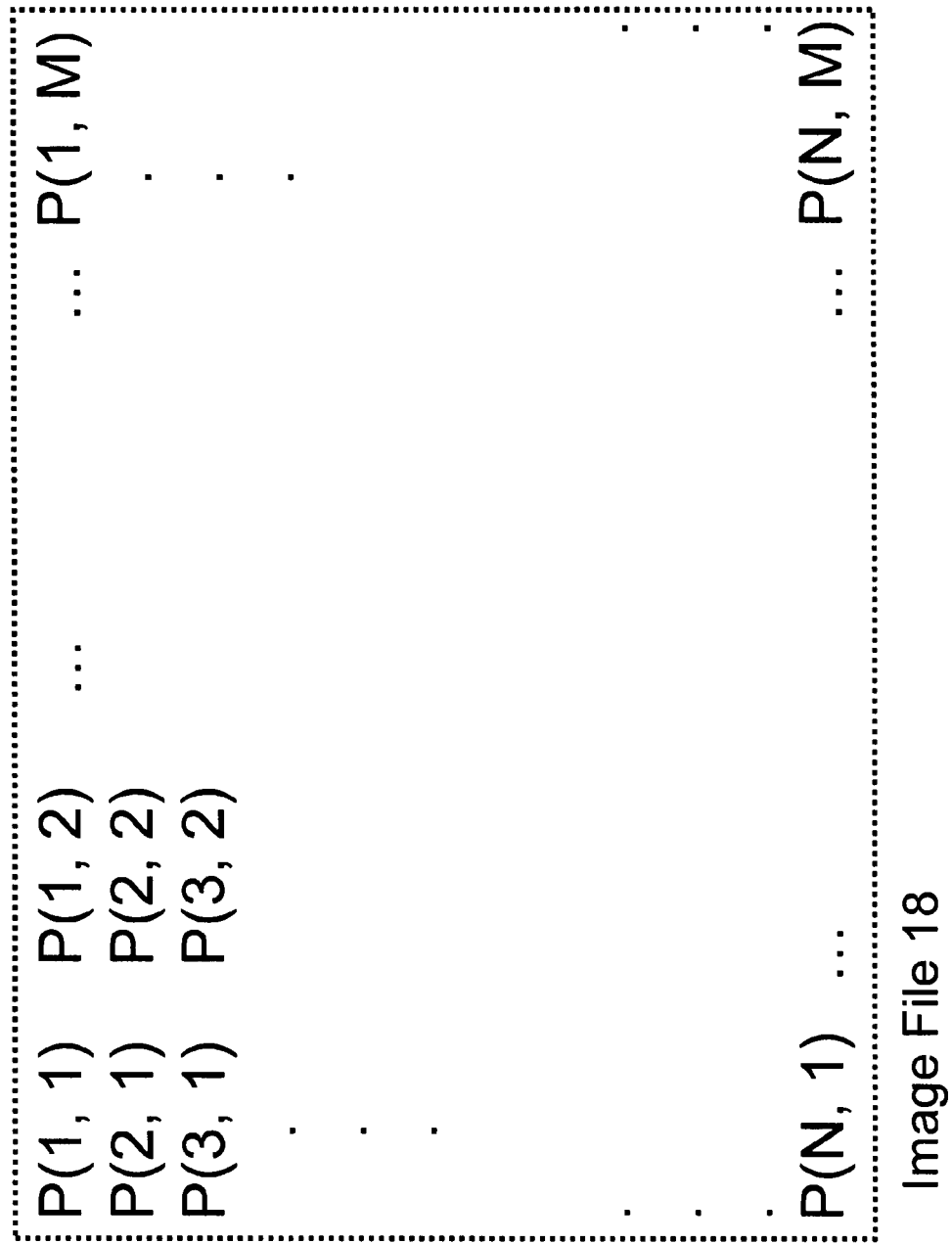
Figure 2: Pixel Array for Storing Image Data

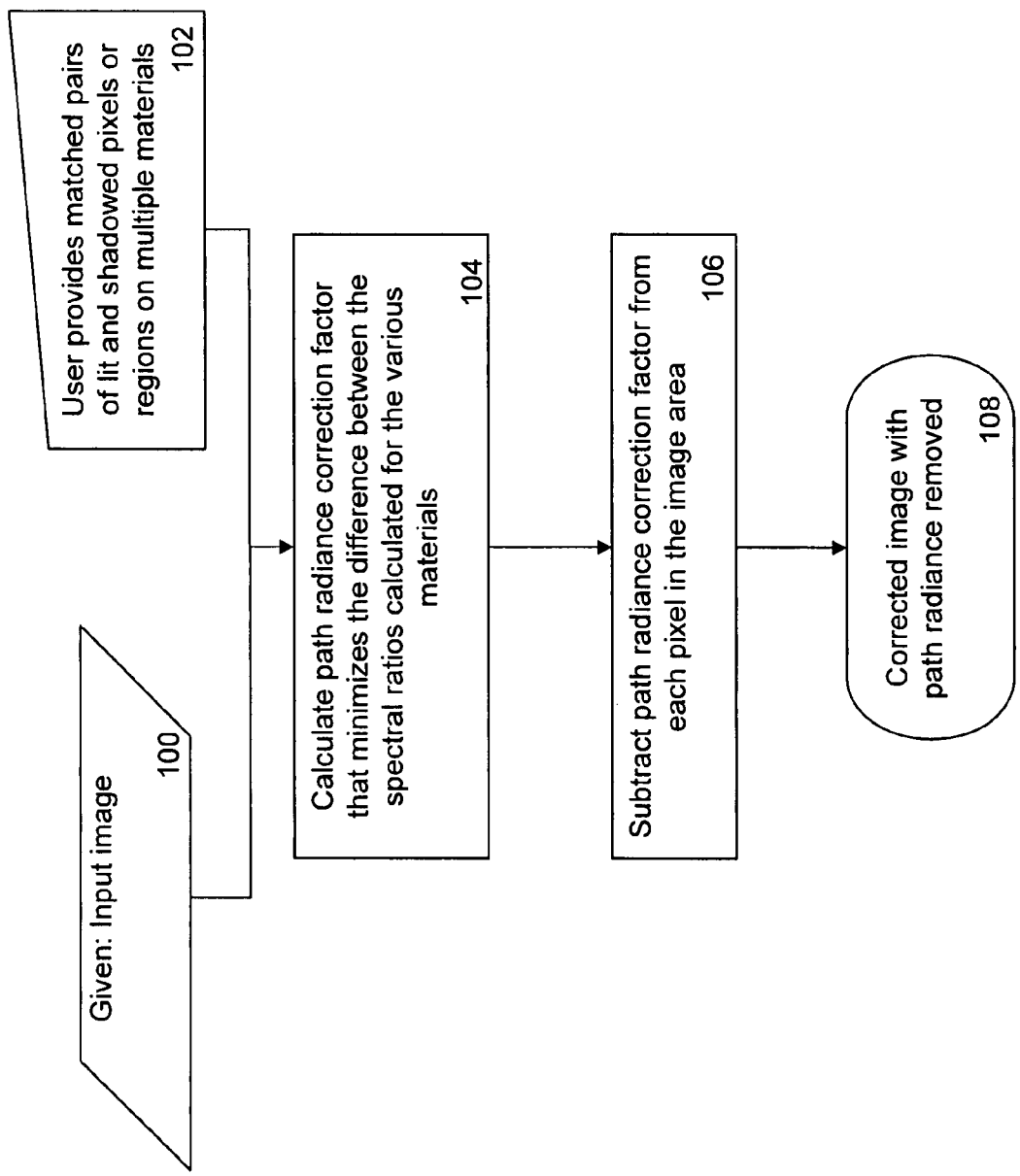
Figure 3: Path Radiance Correction

METHOD AND SYSTEM FOR IMPROVED DETECTION OF MATERIAL REFLECTANCES IN AN IMAGE

This application is a continuation-in-part of application Ser. No. 11/431,755, filed May 10, 2006, entitled A Method And System For Removing Path Radiance From An Image.

BACKGROUND OF THE INVENTION

Images of earth-based objects are routinely captured by satellites in orbit around earth. These images are used in significant and often critical scientific, military and intelligence operations and studies. Typically, the orbiting satellites transmit captured images to earth-based stations for review and study. However, images of earth-based objects, received from a satellite transmission, are often distorted due to effects of the atmosphere. Light reflected from an earth-based object must travel through a thick layer of relatively dense atmosphere before being received by a sensor on board an orbiting satellite. The air in the atmosphere, as well as substances suspended in the atmosphere, such as water droplets and dust, can scatter light that is captured by a sensor on board the satellite. For example, light from the sun can illuminate a microscopic dust particle, that then reflects back to the satellite based sensor. The light measured at each sensor location, (and thus, each pixel of the image) includes the light reflected from the surface of the earth, and all of the light scattered towards the sensor from particles in the path between the earth surface and the orbiting satellite.

Additive intensity at a sensor, caused by light scattered back from particles in the atmosphere, is referred to as path radiance. Path radiance can occur whenever an imaged object is a significant distance from the sensor, and the medium between the object and the sensor is not a vacuum. The removal of path radiance effects is an important objective of designers of systems that involve capturing images from a large distance, such as the design of satellite transmission systems.

In addition to path radiance, similar effects can occur when an image is recorded through transparent glass, cellophane, or other transparent or semi-transparent materials. Other phenomena, such as, for example, ambient specular reflection, while functionally different from path radiance, have a similar effect of increasing measured intensity in different color bands beyond what would be expected in a simple color model such as lambertion reflection.

SUMMARY OF THE INVENTION

The present invention utilizes a constancy of a characteristic spectral ratio for an image to facilitate a correction of effects in an image, such as, for example, path radiance and ambient specular reflection.

In a first exemplary embodiment of the present invention, an automated, computerized method for manipulating an image is provided. The method of the present invention comprises the steps of selecting matched shadow/lit pairs of image portions from each of separate, different materials depicted in the image, utilizing the selected matched pairs to determine spectral ratio information for the image, calculating a correction term as a function of the spectral ratio information and utilizing the correction term to manipulate the image.

In a second exemplary embodiment of the present invention, an automated, computerized method for manipulating an image is provided. The method of the present invention comprises the steps of utilizing a relationship of equality for spectral information of the image to calculate a correction term, and utilizing the correction term to manipulate the image.

In a third exemplary embodiment of the present invention, a computer system comprises a CPU and a memory storing an image file. Pursuant to a feature of the present invention, the computer system is arranged and configured to execute a routine to utilize a relationship of equality for spectral information of an image depicted in the image file, to calculate a correction term and to utilize the correction term to manipulate the image.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The automated, computerized methods can be performed by a digital computer, analog computer, optical sensor, state machine, sequencer or any device or apparatus that can be designed or programed to carry out the steps of the methods of the present invention.

BRIEF DESCRIPTION OF THE DRAWINGS

FIG. 1 is a block diagram of a computer system arranged and configured to perform operations related to images.

FIG. 2 shows an n×m pixel array image file for an image stored in the computer system of FIG. 1.

FIG. 3 is a flow chart for performing an exemplary embodiment of the present invention to implement a path radiance correction for satellite imagery.

DETAILED DESCRIPTION OF THE PREFERRED EMBODIMENTS

Referring now to the drawings, and initially to FIG. 1, there is shown a block diagram of a computer system 10 arranged and configured to perform operations related to images. A CPU 12 is coupled to a device such as, for example, a receiver 14 via, for example, a USB port. In our example, the receiver 14 operates to receive image transmissions from a distant source, such as, for example, an orbiting satellite 14a via an antenna 14b. The satellite 14a comprises a sensor such as a camera operated to capture images of the surface of the earth, transform those images into digital image files, and transmit the digital images to the receiver 14, as is generally known. The receiver 14 then operates to download the images to the CPU 12. The CPU 12 stores the downloaded images in a memory 16 as image files 18. The image files 18 can be accessed by the CPU 12 for display on a monitor 20, or for print out on a printer 22. The CPU 12 can be equipped with a real time operating system for real time operations relating to images.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electro-magnetic spectrum. The present invention can also be utilized in connection with a grayscale image (a single band). The pixel array includes m columns of n rows each, starting with the pixel p(1,1) and ending with the pixel p(n,m). When displaying or printing an image, the CPU 12 retrieves the corresponding image file 18 from the memory 16, and operates the monitor 20 or printer 22, as the case may be, as a function of the digital values of the pixels in the image file 18, as is generally known.

In an image operation, the CPU 12 operates to analyze the RGB values of the pixels of a stored image file 18 to achieve various objectives, such as, for example, manipulation of the image to remove the effects of phenomena such as, for example, path radiance and ambient specular reflection. As recognized by the teachings of the present invention, if the imaged surface is approximately a constant distance away from the satellite sensor, and the atmosphere between the sensor and the imaged surface is reasonably homogeneous (e.g., an even distribution of dust and humidity), then the path radiance contributes a constant term to the total radiance measured by the satellite sensor. Therefore, there is a constant value that, when subtracted from each pixel of a recorded image, changes each pixel so as to reflect the actual radiance of an object or surface without the interference of an intervening medium such as the atmosphere.

According to a feature of the present invention, the CPU 12 is operated to ascertain a constant value that represents the effect of, for example, path radiance. In general, the constant value comprises a separate scalar value for each band in an image. For example, in an RGB image, there will be a first constant for the Red band of the image, a separate second constant for the Green band and a third for the Blue band. The present invention is based upon a constancy of a characteristic spectral ratio for an image, and utilizes this constancy to ascertain information regarding additive intensity in a recorded image for each wave band of the image.

As taught in co-pending application Ser. No. 11/341,742, filed on Jan. 27, 2006, entitled: "Method and System For Identifying Illumination Flux In An Image," now puplished as US 2006/0177149 on Aug. 10, 2006, which is hereby incorporated by reference, an image comprises two components, material and illumination. Moreover, as further taught in the co-pending Application, an illumination flux impinging on a material depicted in an image comprises an ambient illuminant and an incident illuminant. The incident illuminant is light that causes a shadow and is found outside a shadow perimeter. The ambient illuminant is light present on both the bright and dark sides of a shadow, but is more perceptible within the dark region of a shadow.

Spectra for the incident illuminant and the ambient illuminant can be different from one another. A spectral shift caused by a shadow, i.e., a decrease of the intensity of the incident illuminant, will be substantially invariant over different materials present in a scene depicted in an image when the scene is illuminated by a common illumination flux. Thus, the spectral shift caused by a shadow can be expressed by a spectral ratio of colors across an illumination boundary defined by a shadow on a material. Inasmuch as an illumination boundary is caused by the interplay between the incident illuminant and the ambient illuminant, spectral ratios throughout the image that are associated with illumination change, should be consistently and approximately equal, regardless of the color of the bright side or the material object characteristics of the boundary. A characteristic spectral ratio for a particular image or scene within an image, is a spectral ratio associated with illumination change caused by a shadow, as occurs in the particular image.

An exemplary characteristic spectral ratio of an image can be expressed by the equation: $S=D/(B-D)$, wherein D is a senor reading of a color of a material depicted in the image, in shadow (Dark), and B is the sensor reading for the color of that same material when fully lit by the incident illuminant (Bright). According to a feature of the present invention, the constancy of spectral ratios provides a basis for determination of a correction term comprising a constant. For example, consider two different materials depicted in an image stored as an image file 18, $M_1$ and $M_2$. The basic premise, as taught in the co-pending application Ser. No. 11/341,742, is that the spectral ratio ($S_1$) associated with a shadow across $M_1$, will be equal to the spectral ratio ($S_2$) associated with a shadow across $M_2$, or $S_1=S_2$. According to the exemplary spectral ratio equation, the spectral ratio for the first material $M_1$, at a wavelength λ, $S_{1\lambda}=D_{1\lambda}/(B_{1\lambda}-D_{1\lambda})$, and for the second material $M_2$, $S_{2\lambda}=D_{2\lambda}/(B_{2\lambda}-D_{1\lambda})$, wherein, $D_{1\lambda}$ and $D_{2\lambda}$ represent the Dark intensity of the materials $M_1$ and $M_2$, respectively, at the wavelength λ, and $B_{1\lambda}$ and $B_{2\lambda}$ represent the Bright color of the materials $M_1$ and $M_2$, respectively, at the wavelength λ. For each image file 18 of our example, the equation would be used for each of the wavelengths corresponding to the red, green and blue frequencies of the electromagnetic spectrum.

Due to the relationship of $S_{1\lambda}=S_{2\lambda}$, $D_{1\lambda}/(B_{1\lambda}-D_{1\lambda})=D_{2\lambda}/(B_{2\lambda}-D_{1\lambda})$. The relationship of equality between spectral ratios of two different materials is true for body reflection properties of material. The surface scene as captured by, for example, a satellite sensor is altered by the imposition of, for example, path radiance, as discussed above. When measured color values deviate from strict body reflection in a manner that adds constant intensity, each pixel of the image file 18 will reflect the additional radiance by a term $k_\lambda$ in each wave band λ. That is, each measured color in each pixel of the image is the sum of the actual radiance of that point in the scene and the extra intensity, as caused by, for example, path radiance, $k_\lambda$. Accordingly, an equation can be derived, based upon two materials, to account for the effect of path radiance or other phenomena that increase measured intensity in a recorded image, and establish the relationship of equality for the spectral ratios of the underlying image:

$$(D_{1\lambda}-k_\lambda)/(B_{1\lambda}-k_{80}-(D_{1\lambda}-k_\lambda))=(D_{2\lambda}-k_\lambda)/(B_{2\lambda}-k_\lambda-(D_{2\lambda}-k_\lambda)).$$

Solving the above two-material relationship for the correction term constant, $k_\lambda=(D_{2\lambda}B_{1\lambda}-D_{1\lambda}B_{2\lambda})/(B_{1\lambda}-B_{2\lambda}+D_{2\lambda}-D_{1\lambda})$.

In our example, a constant $k_\lambda$ is determined for each of the wavelengths, λ, corresponding to, for example, the red, green and blue frequencies of the electromagnetic spectrum. Upon determination of a constant for each wavelength band of the image, according to the above-described feature of the present invention, the CPU 12 can operate to simply subtract the constant values from the respective bands of each pixel of the image, to thereby remove the effects of a phenomena such as, for example, path radiance and ambient specular reflection.

Referring now to FIG. 3, there is shown a flow chart for performing a path radiance correction for satellite imagery, according to a exemplary embodiment of the present invention. The routine of FIG. 3 can be applied to any image captured from a significant distance, and therefore subject to the effects of path radiance. These can include, for example, aerial photography and outdoor photography of distant scenes, such as a distant mountain range. Indeed, in any environment having a reasonably homogeneous distribution of reflective particulate matter between the sensor and the scene, an image file 18 corresponding to the scene can exhibit the effects of path radiance that can potentially be corrected according to the routine of FIG. 3. In step 100, an image taken from a significant distance, for example, an image file 18, is accessed by the CPU 12. In step 102, a user selects matched pairs of lit and shadowed portions (pixels or sections) of the image on multiple different materials depicted in the image, one matched pair per material. What is visible to the eye of a user, upon display on the monitor 20 of a stored image file 18 accessed by the CPU 12, is the pixel color values caused by the interaction between specular and body reflection properties of material objects depicted in, for example, a scene in the subject image file 18, and illumination flux present at the time the image was captured by a sensor at a significant distance, as for example, a sensor on board the satellite 14a.

A user can select regions of a shadow across a single material because human eye physiology is capable of distinguishing between shadows and actual physical objects. Step 102 can be implemented by an interactive clicking by the user on the monitor 20 operating to display the subject image file 18. In a preferred embodiment of the present invention, several pairs (more than two) of lit/shadow pixels for n different materials are selected by a user to improve the accuracy of the correction. For example, as taught in the co-pending application Ser. No. 11/341,742, the accuracy and correctness of the characteristic ratio for an image is improved by determining spectral ratio information for illumination boundaries on a local level, that is, a characteristic spectral ratio is determined for each of several preselected local areas of a scene depicted in an image. The determination of locally relevant spectral ratios accommodates complexities that may be encountered in a real world image, for example, the interplay of several different sources of light, inter-reflections, and so on. Thus, if a user provides selected pairs of pixels across shadows for more than two different materials, the CPU 12 will be able to calculate a more robust estimate for the correction term, $k_\lambda$. In the alternative, step 102 can be implemented automatically via an automatic technique for determining illumination flux in an image, as taught in the co-pending application Ser. No. 11/341,742.

In step 104, the CPU 12 calculates a correction term in a manner that minimizes the differences between characteristic spectral ratios of the entire image. In general, with more than two bright/dark pixel or image section pairs selected by a user, there is no single value for $k_\lambda$ that yields a same value for S across all of the selected materials of the image. According to a feature of the present invention, the CPU 12 determines an optimized value for $k_\lambda$ that accommodates spectral ratios that are as similar as possible.

Initially, in a straightforward implementation of the present invention, the CPU 12 calculates a $k_\lambda$ value for each two material set $(M_1, M_2)$ of lit/shadow pairs selected by the user, in step 102, using the two material formula developed above, for each two material set: $k_\lambda=(D_{2\lambda}B_{1\lambda}-D_{1\lambda})/(B_{1\lambda}-B_{2\lambda}+D_{2\lambda}-D_{1\lambda})$. This provides a list of possible values for $k_\lambda$. Additionally, for each possible $k_\lambda$, the user can select a confidence weight, w, for each selected material of the corresponding material pair. The confidence weight reflects the user's confidence that a selected shadow is indeed across a single material, and can be set as a value selected from a scale of, for example, 0 to 1. Each two material set can be designated by reference numerals i, j, wherein i represents material $M_1$, and j represents material $M_2$ of each selected pair. Thus, each material will have an associated weight, $w_i$ and $w_j$ for materials $M_i$ an $M_j$, respectively. Moreover, each correction term from the list of possible values can be designated as $k_{\lambda ij}$.

According to a feature of the present invention, an overall value for $k_\lambda$ can be determined as a mean or median, or through use of a standard mean shift procedure. For determination of a mean, $k_\lambda=(\Sigma_{i\neq j}$ combine $(w_i, w_j)*k_{\lambda ij})/(\Sigma_{i\neq j}$ combine $(w_i, w_j))$. A combine$(w_i, w_j)$ function is used because each $k_{\lambda ij}$ is based upon two different materials, each having a weight assigned by the user. The combine function can be determined in terms of a minimum, multiply or average. In a minimum determination, combine$(w_i, w_j)$=min$(w_i, w_j)$. In a multiply determination, combine$(w_i, w_j)$=$w_i*w_j$. Finally, in an average determination, combine$(w_i, w_j)$=$(w_i+w_j)/2$.

Pursuant to a further feature of the present invention, the CPU 12 can be operated to define $k_\lambda$ more rigorously than provided by the above described simple mean, median or mean shift approaches on the pairwise-calculated $k_{\lambda ij}$. A more rigorous approach can be based upon a rigorous definition of dissimilarity so as to find a $k_\lambda$ value that accommodates spectral ratios that are as similar as possible.

In a first approach to a definition of dissimilarity, a sum-squared difference is utilized. In a sum-squared difference, the sum of the squared differences between spectral ratios of the image should be as small as possible. Thus, a selection for $k_\lambda$ is such as to minimize the following summation: $\Sigma_{(i=1, n)}\Sigma_{(j=(i+1), n)}$ combine$(w_i, w_j)*((D_{i\lambda}-k_\lambda)/(B_{i\lambda}-k_\lambda-(D_{i\lambda}-k_\lambda))-(D_{j\lambda}-k_\lambda)/(B_{j\lambda}-k_\lambda-(D_{j\lambda}-k_\lambda)))^2$, for n values of different materials.

In a second approach, a sum absolute difference is utilized. Here, the sum of the absolute differences between spectral ratios should be as small as possible. The selection of $k_\lambda$ is set to minimize: $\Sigma_{(i=1, n)} \Sigma_{(j=(i+1), n)}$ combine$(w_i, w_j)*|(D_{i\lambda}-k_\lambda)/(B_{i\lambda}-k_\lambda-(D_{i\lambda}-k_\lambda))-(D_{j\lambda}-k_\lambda)/(B_{j\lambda}-k_\lambda-(D_{j\lambda}-k_\lambda))|$.

A third approach to the definition of dissimilarity involves a minimization of the maximum absolute distance between any two spectral ratios. The selection of $k_\lambda$ is set to minimize: $\max_{i\neq j}$ (combine$(w_i, w_j)*|(D_{i\lambda}-k_\lambda)/(B_{i\lambda}-k_\lambda-(D_{i\lambda}-k_\lambda))-(D_{j\lambda}-k_\lambda)/(B_{j\lambda}-k_\lambda-(D_{j\lambda}-k_\lambda))|$).

Given one of the definitions of dissimilarity, the CPU 12 can proceed to execute a method to determine a $k_\lambda$ for the image, as a function of the definition of dissimilarity. In a closed-form solution, there is a value for $k_\lambda$ that minimizes the dissimilarity between spectral ratios. For example, a closed-form solution can be used for the sum-squared difference definition, wherein the CPU 12 can set $V=\Sigma_{(i=1, n)} \Sigma_{(j=(i+1), n)}$ combine$(w_i, w_j)*((D_{i\lambda}-k_\lambda)/(B_{i\lambda}-k_\lambda-(D_{i\lambda}-k_\lambda))-(D_{j\lambda}-k_\lambda)/(B_{j\lambda}-k_\lambda-(D_{j\lambda}-k_\lambda)))^2$, and then differentiate V with respect to $k_\lambda$. For any value of n, V is quadratic, so that $_{d/dk\lambda}V=0$ has a unique solution.

Alternatively, a search technique can be implemented so that the CPU 12 can search for a value of $k_\lambda$ that minimizes the dissimilarity. For example, in a linear search, a range of values for $k_\lambda$ is tested to determine a value with a minimum dissimilarity, as expressed by one of the definitions of dissimilarity described above. The search is bounded by minimum and maximum values for $k_\lambda$, and conducted through a range of m intervals, between the minimum and maximum values of $k_\lambda$. A dissimilarity for the spectral ratios is calculated for each value of $k_\lambda$ in the range, and the value for $k_\lambda$ with the minimum dissimilarity is selected. The search can be repeated for a range above and below the selected $k_\lambda$ from the previous iteration. The number of iterations can be fixed at a predetermined number, or until a predetermined level of accuracy is reached.

Initial values for the maximum and minimum bounds for $k_\lambda$ can correspond to the maximum and minimum values for $k_\lambda$ in the list of possible values calculated by the CPU 12, as described above. Or, in the alternative, the maximum value for $k_\lambda$ can be set equal to the minimum measured image value for the current wavelength $\lambda$, anywhere in the image and the minimum value for $k_\lambda$ set at 0.

In step 106, the CPU 12 utilizes the calculated $k_\lambda$ for each wavelength, from step 104, to correct each pixel of the image file 18. In a standard image, there will be a correction term for each of the Red, Green and Blue bands of each pixel. A multi-spectral image may have more than three bands. The path radiance (or other effect causing increased measured intensity beyond body refelection, as discussed below) is removed from each pixel by subtracting $k_\lambda$ from each wave band in each pixel: $\forall_i \lambda: P_{i\lambda} \leftarrow P_{i\lambda} - k_\lambda$, where $P_{i\lambda}$ is the value of pixel i in the wave band $\lambda$. If a correction causes $P_{i\lambda}$ to be less than 0, then the pixel value is set to 0.

In step 108, the CPU 12 outputs the image with path radiance removed.

According to a feature of the present invention, the routine of FIG. 3 is implemented to remove any effect causing a dissimilarity among spectral ratios related to the image. A value for $k_\lambda$ is determined to provide a maximum agreement among spectral ratios of an image, in any circumstance where an image is corrupted by an additive effect to measured intensity. For example, the effects of ambient specular reflection. In the standard reflection model, illumination interacts with a material in a certain manner, for example, via a specular reflection and a body reflection. A body reflection results when illumination is reflected by pigment molecules of the material. That is perceived as a color of the material. Specular reflection represents illumination reflected off the surface of a material without interacting with pigment molecules.

In circumstances where materials depicted in a recorded image are near to one another relevant to a common plane, and the materials have similar specular reflection properties, then an ambient specular reflection manifests as a constant spectrum added onto the recorded body reflection. Thus, a value for $k_\lambda$, determined and applied as per the steps of FIG. 3, will correct a recorded image of a scene exhibiting an ambient specular reflection.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for manipulating an image comprising the steps of:
   a computer executing the following steps:
   selecting matched shadow/lit pairs of image portions from each of separate, different materials depicted in the image;
   utilizing the selected matched pairs to determine spectral ratio information for the image;
   calculating a correction term as a function of the spectral ratio information; and
   utilizing the correction term to manipulate the image.

2. The method of claim 1, wherein the step of selecting matched shadow/lit pairs of image portions from separate, different materials depicted in the image is carried out by a manual input by a user.

3. The method of claim 1, wherein the step of utilizing the selected matched pairs to determine spectral ratio information for the image is carried out by utilizing a relationship of equality for spectral ratios of the image.

4. The method of claim 3, wherein the step of calculating a correction term as a function of the spectral ratio information is carried out by executing a formula for a relationship of equality of spectral ratios for two different materials, expressed as: $k_\lambda = (D_{2\lambda} B_{1\lambda} - D_{1\lambda} B_{2\lambda})/(B_{1\lambda} - B_{2\lambda} + D_{2\lambda} - D_{1\lambda})$.

5. An automated, computerized method for manipulating an image comprising the steps of:
   a computer executing the following steps:
   utilizing a relationship of equality for characteristic spectral ratio information derived from illumination change caused by shadows in the images, to calculate a correction term; and
   utilizing the correction term to manipulate the image.

6. The method of claim 5 wherein the step of utilizing a relationship of equality for characteristic spectral ratio information of the image to calculate a correction term is carried out by calculating a set of possible correction values for the image, and determining an optimized value for the correction term from among the set of possible correction values.

7. The method of claim 6 wherein the step of determining an optimized value for the correction term from among the set of possible correction values is carried out by calculating a mean value from the set of possible correction values.

8. The method of claim 6 wherein the step of determining an optimized value for the correction term from among the set of possible correction values is carried out by calculating a median value from the set of possible correction values.

9. The method of claim 6 wherein the step of determining an optimized value for the correction term from among the set of possible correction values is carried out by executing a mean shift procedure on the set of possible correction values.

10. The method of claim 6 wherein the step of calculating a set of possible correction values for the image is carried out by executing a formula for a relationship of equality of spectral ratios for each of several sets of two different materials, expressed as: $k_\lambda = (D_{2\lambda} B_{1\lambda} - D_{1\lambda} B_{2\lambda})/(B_{1\lambda} - B_{2\lambda} + D_{2\lambda} - D_{1\lambda})$, for each two material set.

11. The method of claim 10 comprising the further step of assigning a confidence weight to each material of each two material set.

12. The method of claim 11 wherein the step of determining an optimized value for the correction term from among the set of possible correction values is carried out as a function of the confidence weight of each material.

13. The method of claim 5 wherein the step of utilizing a relationship of equality for characteristic spectral ratio information of the image to calculate a correction term is carried out by selecting a value for the correction term to minimize a dissimilarity among spectral ratios related to the image.

14. The method of claim 13 wherein the dissimilarity is measured as a sum-squared difference.

15. The method of claim 13 wherein the dissimilarity is measured as a sum absolute difference.

16. The method of claim 13 wherein the dissimilarity is measured as a maximum absolute difference.

17. The method of claim 14 wherein the step of selecting a value for the correction term to minimize a dissimilarity among spectral ratios related to the image is carried out by executing a closed-form solution.

18. The method of claim 13 wherein the step of selecting a value for the correction term to minimize a dissimilarity among spectral ratios related to the image is carried out by executing a search procedure over a range of possible values for the correction term, between predetermined maximum and minimum values of the range.

19. The method of claim 5 wherein the step of utilizing the correction term to manipulate the image is carried out to remove path radiance effects from the image.

20. The method of claim 5 wherein the step of utilizing the correction term to manipulate the image is carried out to remove ambient specular reflection effects from the image.

21. The method of claim 5 wherein the step of utilizing the correction term to manipulate the image is carried out to remove an effect causing a dissimilarity among spectral ratios related to the image.

22. A computer system which comprises:

a CPU; and a memory storing an image file;

the CPU arranged and configured to execute a routine to utilize a relationship of equality for characteristic spectral ratio information derived from illumination change caused by shadows in an image depicted in the image file, to calculate a correction term; and to utilize the correction term to manipulate the image.

23. A computer program product, disposed on a computer readable media, the product including computer executable process steps operable to control a computer to: select matched shadow/lit pairs of image portions from each of separate, different materials depicted in an image, utilize the selected matched pairs to determine spectral ratio information for the image, calculate a correction term as a function of the spectral ratio information and utilize the correction term to manipulate the image.

24. A computer program product, disposed on a computer readable media, the product including computer executable process steps operable to control a computer to: utilize a relationship of equality for characteristic spectral ratio information derived from illumination change caused by shadows in an image depicted in an image file, to calculate a correction term and utilize the correction term to manipulate the image.

* * * * *